US007073403B2

(12) United States Patent
Albro et al.

(10) Patent No.: US 7,073,403 B2
(45) Date of Patent: Jul. 11, 2006

(54) METHOD AND APPARATUS FOR THE COLLECTION OF SAMPLES

(75) Inventors: Thomas G. Albro, Bel Air, MD (US); John C. Berends, Jr., Bel Air, MD (US)

(73) Assignee: EAI Corporation, Abingdon, MD (US)

(*) Notice: Subject to any disclaimer, the term of this patent is extended or adjusted under 35 U.S.C. 154(b) by 39 days.

(21) Appl. No.: 10/988,915

(22) Filed: Nov. 15, 2004

(65) Prior Publication Data

US 2005/0092109 A1 May 5, 2005

Related U.S. Application Data

(63) Continuation-in-part of application No. 10/263,584, filed on Oct. 3, 2002, now Pat. No. 6,819,253.

(51) Int. Cl.
*G01N 1/14* (2006.01)

(52) U.S. Cl. ...................... 73/863.83; 73/863; 73/23.2

(58) Field of Classification Search ............ 73/863.83, 73/863, 23.2, 31.03

See application file for complete search history.

(56) References Cited

U.S. PATENT DOCUMENTS

| | | | | |
|---|---|---|---|---|
| 1,559,461 | A * | 10/1925 | Ruben | 73/31.04 |
| 5,259,233 | A * | 11/1993 | Brandt | 73/31.03 |
| 5,325,705 | A * | 7/1994 | Tom | 73/31.03 |
| 5,542,284 | A * | 8/1996 | Layzell et al. | 73/23.2 |
| 5,770,793 | A * | 6/1998 | Stock | 73/23.21 |
| 5,961,936 | A * | 10/1999 | Heredia | 422/292 |
| 6,068,686 | A * | 5/2000 | Sorensen et al. | 96/135 |
| 6,284,019 | B1 * | 9/2001 | Sorensen et al. | 95/13 |
| 6,415,646 | B1 * | 7/2002 | Kessel et al. | 73/23.2 |
| 6,477,906 | B1 * | 11/2002 | Peterson | 73/863.21 |
| 6,597,286 | B1 * | 7/2003 | Shih et al. | 340/540 |
| 6,819,253 | B1 * | 11/2004 | Albro et al. | 340/632 |

* cited by examiner

*Primary Examiner*—Hezron Williams
*Assistant Examiner*—Rodney Frank
(74) *Attorney, Agent, or Firm*—Ronald H. Shubert

(57) ABSTRACT

A system for the collection of near real time confirmation samples is provided to quickly eliminate false positive alarms by confirming the presence or absence of a chemical agent when a monitor operating in near real time to detect the presence of that chemical agent generates an alarm. The confirmation sampling system is synchronized with the near real time monitor and the confirmation sampler and monitor draw common samples of the atmosphere of concern. In the event that the monitor generates an alarm, the confirmation sampler preserves the sample taken contemporaneously with the alarm event for separate analysis, and also takes and preserves one or more follow-on samples.

15 Claims, 7 Drawing Sheets

METHOD AND APPARATUS FOR THE COLLECTION OF SAMPLES

This application is a continuation-in-part of U.S. patent application Ser. No. 10/263,584 filed on Oct. 3, 2002, now U.S. Pat. No. 6,819,253.

BACKGROUND OF THE INVENTION

1. Technical Field

This invention relates to methods and devices to confirm the presence or absence of a chemical agent after a monitor for the detection of that agent alarms.

2. Description of Related Art

It is becoming a common practice both in military and industrial applications to continuously monitor the atmosphere to detect and to warn of the presence of a toxic chemical agent or other chemical compound of environmental concern. Monitoring is ordinarily accomplished using a near-real-time (NRT) monitor alarm system that is designed to detect sub time weighted average (TWA) concentrations of the chemical agent or compound of interest. As a result, such systems operate at the limits of sensitivity and selectivity so as to provide the maximum protection to exposed workers and the environment. An undesirable consequence of operating a detection system at its sensitivity and selectivity limits is the inevitable production of false positive alarms that can result in large increases in operating costs.

It is desirable to quickly confirm the presence or absence of the chemical agent when a NRT monitor sounds an alarm. Confirmation of the NRT analysis requires a second analysis of the same atmosphere that generated the original alarm and also requires that the confirmation technique used have at least equivalent, and preferably better, sensitivity and selectivity than does the NRT monitor. To achieve that end, sufficient quantities of the original air sample must be continually collected to allow analytical confirmation of any single cycle event that triggers an alarm. Complicating the problem is the need to minimize the cycle time of the NRT monitor. Cycle time is that period between taking a particular sample and reporting the results of the analysis of that sample, and typically ranges from about three to fifteen minutes depending upon the application.

NRT confirmation techniques in current use typically employ a depot area air monitoring system (DAAMS tube) for the collection of confirmation samples. The DAAMS system uses solid sorbents packed within a glass or stainless steel tube to collect the sample. The sample is then thermally desorbed into a gas chromatograph for separation and detection. Use of the DAAMS system is advantageous in that it allows the trapping and concentration of a large volume sample in a single sampling tube without the use of trapping solvents that would otherwise dilute the sample. The DAAMS tubes are reusable and generate virtually no waste. Major disadvantages of the DAAMS system are that it requires unique and proprietary automatic thermal desorption equipment for sample introduction and that the entire sample is consumed during the analysis, thus precluding multiple or repeat analysis of a sample.

Physical limitations dictate how the confirmation of an event can be accomplished. The TWA concentrations for most chemical agents require that the NRT monitor operate at its maximum achievable sensitivity and selectivity and its minimum cycle time. Consequently, there are a number of parameters that affect the efficacy of NRT confirmation monitoring. Among those parameters are the sampling rate and the kind or type of sampling that is conducted. The sampling rate for a NRT confirmation system is dependent upon the sensitivity of the method used to analyze the confirmation sample. Sensitivity of the confirmation analysis is typically no better than is that of the NRT monitor. Hence, the sampling rate for the confirmation sampler needs to be as high if not higher than the sampling rate for the NRT sampler.

There are currently two approaches to confirmation sampling that differ in kind or type; continuous and on-demand sampling. In continuous sampling, a DAAMS tube is placed at the same location as is the NRT monitor and the tube collects sample as the NRT monitor operates. An advantage to that approach is that when the NRT monitor signals an alarm the atmosphere which generated the alarm has been concurrently sampled and any chemical agent present has been captured on the sorbent loaded in the DAAMS tube. Disadvantages are that the confirmation sampling has been conducted over multiple NRT monitor cycles, and compounds captured by the DAAMS tube often include contaminants and interferents in addition to the chemical agent. Another disadvantage to continuous sampling is that it is cumulative. If chemical agents are present in the atmosphere in such low levels as to be undetectable by the NRT monitor they would accumulate on the DAAMS tube. Over time, the level of agent captured by the DAAMS tube would build up to a point where it would be difficult or impossible to associate the agent seen by confirmation sampling with an actual alarm event. Further, some chemical agents degrade rapidly after their release to the environment, and those agents are generally not amenable to a continuous sampling approach.

In on-demand sampling, the NRT monitor is used to control the operation of a confirmation sampler placed at the same location. When the NRT monitor generates an alarm, it also produces a signal that turns on, or energizes, the confirmation sampler. In current practice, the confirmation sampler employs three DAAMS tubes. The confirmation sampler, upon receiving an alarm signal from the NRT monitor, draws air through the first DAAMS tube for a pre-set time period, typically about fifteen minutes. If the NRT monitor is still in alarm status at the end of the first sampling period, the confirmation sampler sequences to the second DAAMS tube. Otherwise, the confirmation sampler waits for the next alarm event that is captured with the next tube in the sequence. That mode of operation continues until all three DAAMS tubes have been used or the tubes have been collected and the sampler reset.

On-demand sampling also has unique advantages and disadvantages. One advantage is the near elimination of contaminant or interferent buildup on the tube as well as the accumulation of chemical agent that is present in the atmosphere at levels below the detectability limit of the NRT monitor. In addition, the pump used to draw sample through the DAAMS tubes operates only when an alarm event is suspected, thus considerably increasing pump life. Logistical difficulties and concerns associated with changing out DAAMS tubes in the field are reduced as well. A primary disadvantage to on-demand sampling that the atmosphere which causes the NRT monitor to trigger an alarm is not sampled by the confirmation sampler. Rather, the sampled atmosphere is that one present a short time, a few minutes, after the triggering event. That circumstance opens the possibility of being unable to confirm a transient, or single cycle, event.

It is apparent that a confirmation sampling system combining the advantages of both currently used approaches while reducing or eliminating their disadvantages would be a significant advance in the art.

SUMMARY OF THE INVENTION

An improved confirmation sampler for an analytical monitor employs at least a pair of sorbent-packed sample tubes that sample and purge out of phase one with the other. While one tube is sampling, the other tube is purging to remove any contaminants collected during its sampling cycle. The sampler includes control means that synchronize its operation with that of the monitor so that when the monitor is sampling so also is one of the tubes of the confirmation sampler. An alarm generated by the monitor upon detection of a chemical agent or other compound of interest causes the confirmation sampler to retain and not desorb the tube that was collected for that particular cycle, leaving it available for retrieval and analysis. If an alarm is not generated upon completion of a particular monitor cycle, sampling by the confirmation sampler is initiated upon the start of the next monitor cycle using the other sample tube. The first tube is simultaneously desorbed to remove any contaminants that may have been collected during its sampling cycle and to ready it for reuse.

BRIEF DESCRIPTION OF THE DRAWING

The invention will be described in relation to the following drawing figures in which.

DESCRIPTION OF PREFERRED EMBODIMENTS OF THE INVENTION

Figure 1:
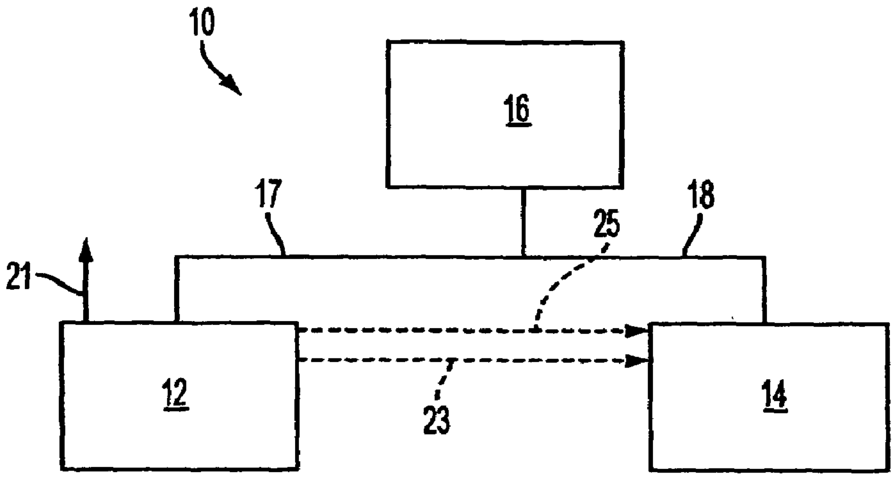
FIG. 1 is a generally schematic view depicting the arrangement of an NRT monitor and a confirmation sampler arranged in accordance with this invention.

The invention will be described with particular reference to that embodiment employing a NRT monitoring system that is operated in association with a confirmation sampler which uses sorbent-filled sample tubes as is illustrated in the drawing figures. Referring now to FIG. 1, the sampling system of this invention is shown generally at 10. System 10 includes a NRT monitor 12 and a confirmation sampler 14. Monitor 12 and sampler 14 are arranged to draw common samples of ambient air or other gaseous atmosphere from a source 16 by way of sample lines 17 and 18. Monitor 12 is arranged to generate an alarm signal 21 upon detection of a chemical agent and, at the same time, to send a signal 23 to sampler 14. Signal 23 causes sampler 14 to retain the just-taken sample in a manner that will be described in detail later. The NRT monitor also generates another signal 25_separate from the alarm signal. Signal 25 marks the start of an NRT monitor cycle,_and confirmation sampler 14 uses that signal to synchronize the initiation of its own sampling cycle.

Figure 2:
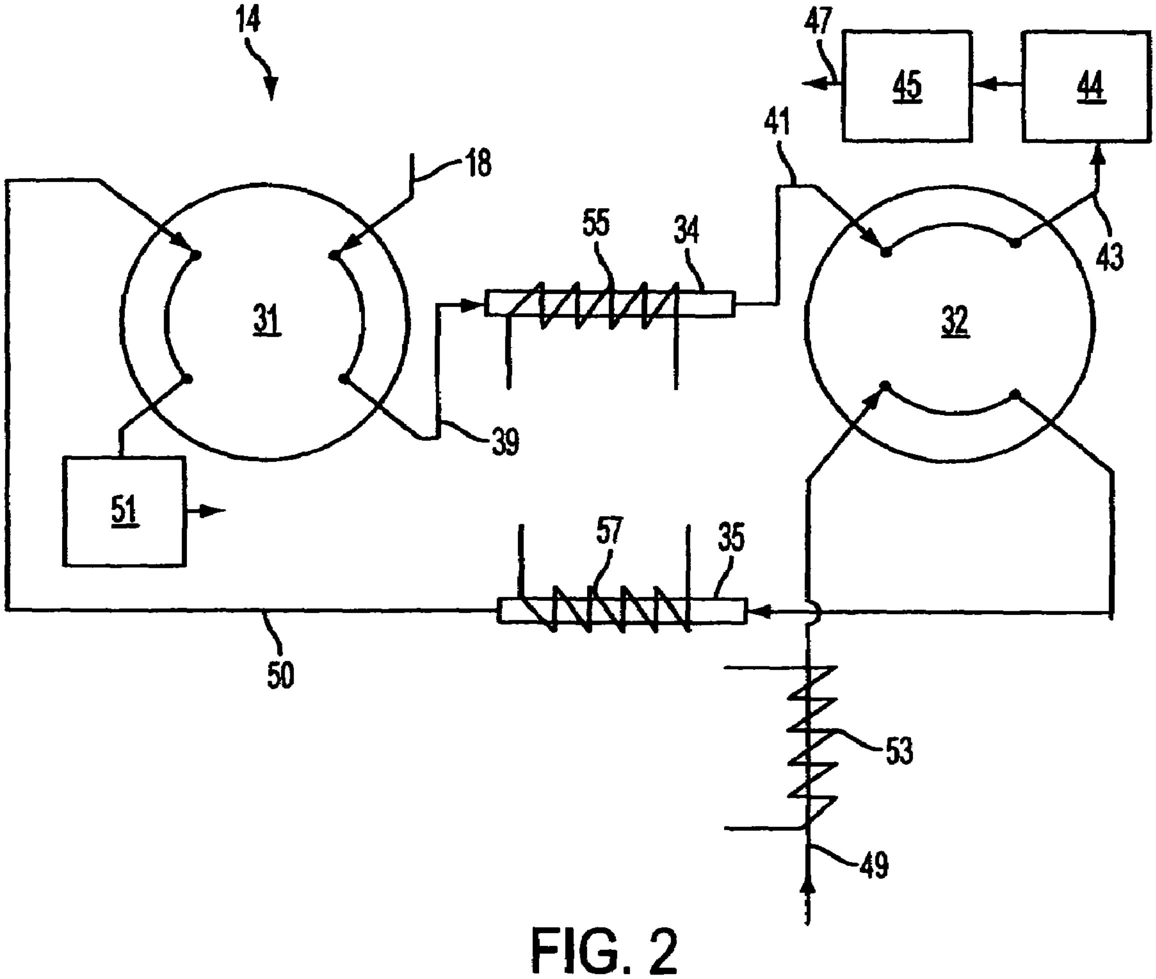
FIG. 2 is a schematic view showing the components of the confirmation sampler of this invention in a first sampling configuration.
Figure 3:
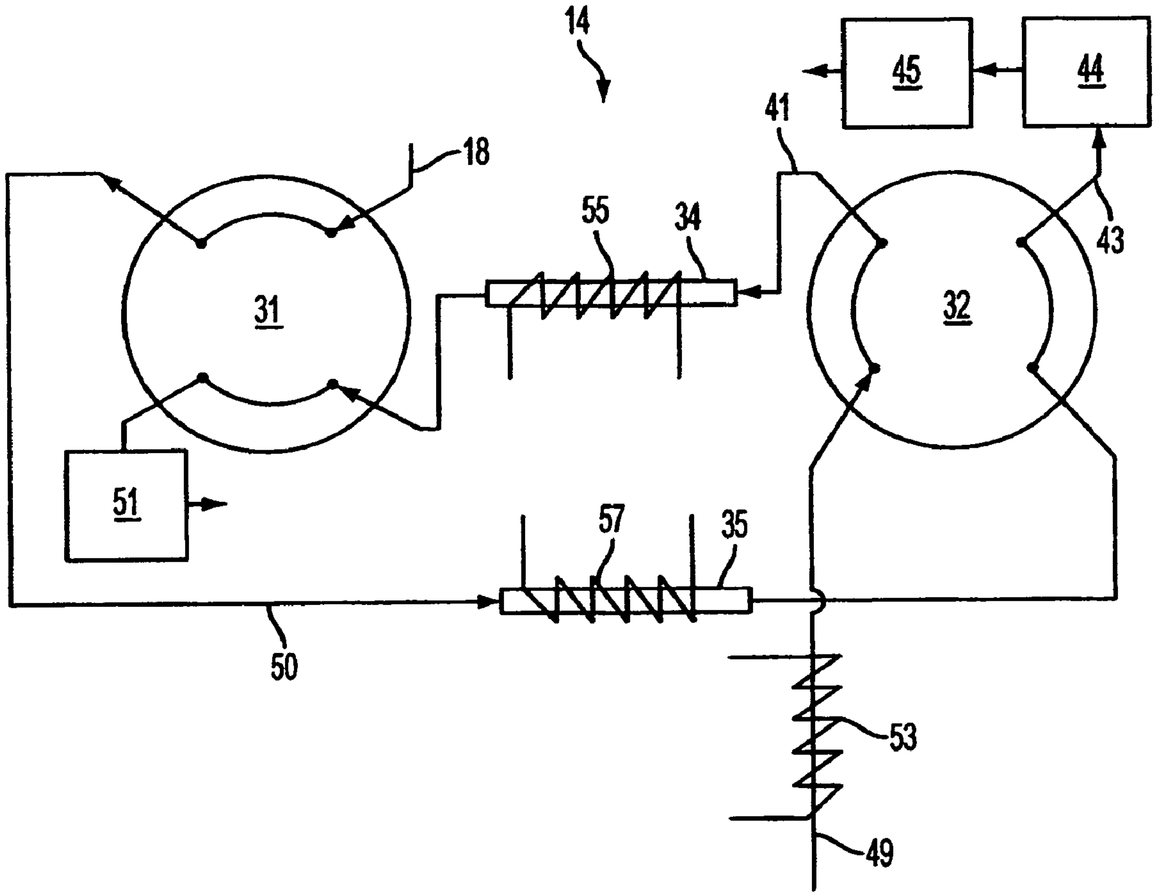
FIG. 3 is a schematic view of the sampler of FIG. 2 in a second sampling configuration.

Certain components of confirmation sampler 14 are schematically shown in FIGS. 2 and 3. Referring now to those Figures as well as to FIG. 1, sampler 14 includes two four-port, two-position valves 31,32. Two sampling tubes, 34,35 are arranged in communication with the two valves in a manner to be described in more detail. FIG. 2 shows the valves 31,32 in a first position whereat tube 34 is in sampling position, and FIG. 3 shows the valves 31,32 in a second position whereat tube 35 is in sampling position.

Referring now to FIG. 2, a flowing sample from the source of air or gas being monitored is introduced into valve 31 by way of sample introduction line 18. Valve 31, in its first position, routes the sample out of the valve by way of line 39 into and through sample tube 34 where the chemical agent, if present, is captured by a solid sorbent packed within the tube. Tubes 34 and 35 are preferably standard DAAMS tubes, but may be any other sorbent-packed sample tube. The solid sorbent packed within the tubes may be, for example, alumina, silica, activated carbon, a molecular sieve or other sorbent depending upon the properties of the chemical agent being monitored. After leaving tube 34, the gas sample is routed via line 41 through valve 32 and passes by way of exit line 43 to the inlet of a vacuum pump_44. Vacuum pump 44, in turn,_exhausts the air or other gas that is being sampled into a mass flow controller 45_which sets the rate at which pump 44 draws gas through the system. Controller 45 then discharges the sampled gas back to the atmosphere by way of discharge line 47.

While a gas sample is passing through tube 34, tube 35 is being purged to remove any chemical agent, contaminant or interferent that might have been captured on the tube packing during a previous sampling. Purging, or regeneration, is accomplished by flowing a heated purge gas through the system by way of line 49 and valve 32 and through sample tube 35 and to valve 31 via conduit 50. The gas is then discharged to atmosphere after passing through an optional charcoal trap 51 that captures any purged compounds desorbed from tube 35. The purge gas is preferably an inert gas such as nitrogen or helium. In those installations where the confirmation sampler is conveniently located in relation to the NRT monitor the inert purge gas used by the NRT monitor can be shared with the purge gas for the confirmation sampler.

Sample tubes 34 and 35 are provided with heat exchange means 55 and 57 respectively to heat the tubes and the purge gas passing therethrough to temperatures at which thermal desorption proceeds. Heat exchange means 55 and 57 may also serve to cool the tubes after desorption and, using a thermoelectric cooler, it is possible to achieve both heating and cooling using a single element. Alternatively, or in addition to heat exchange means 55 and 57, the purge gas may be heated prior its entry into the sample tubes using heat exchange means 53 that is located upstream of the sample tubes. Means 53 may comprise any conventional heating means or may comprise a thermoelectric cooler that can provide a heated gas stream to desorb the tube and a colder gas stream to cool the tube after desorption has been completed. Sub ambient cooling allows faster cycle times since the tube can be brought down to its sampling temperature more rapidly than if allowed to cool in an ambient temperature gas stream.

FIG. 3 illustrates the system with valves 31 and 32 in the second position that serves to reverse the flow paths of gas through the system. Here, valve 31 routes the incoming sample in line 47 through sample tube 35 by way of line 50, and then to valve 32, vacuum pump 44 and mass flow controller 45. In the meantime, a heated purge gas stream 49 is passed through sample tube 34 to valve 31, and out of the system through charcoal trap 51.

As may be appreciated from the foregoing description, the confirmation sampling system of this invention includes two, sorbent-packed sample tubes, preferably DAAMS tubes, which alternately sample the local atmosphere that is being monitored. While one tube is sampling, the other tube is purging to remove any contaminants collected during its sampling cycle. That sampling cycle is synchronized with the sampling cycle of the NRT monitor so that a confirmation sample is taken contemporaneously with each sample taken by the NRT monitor. If an alarm is generated by the NRT monitor, the confirmation sample for that cycle is not desorbed, and is therefore available for retrieval and analysis.

Figure 4:
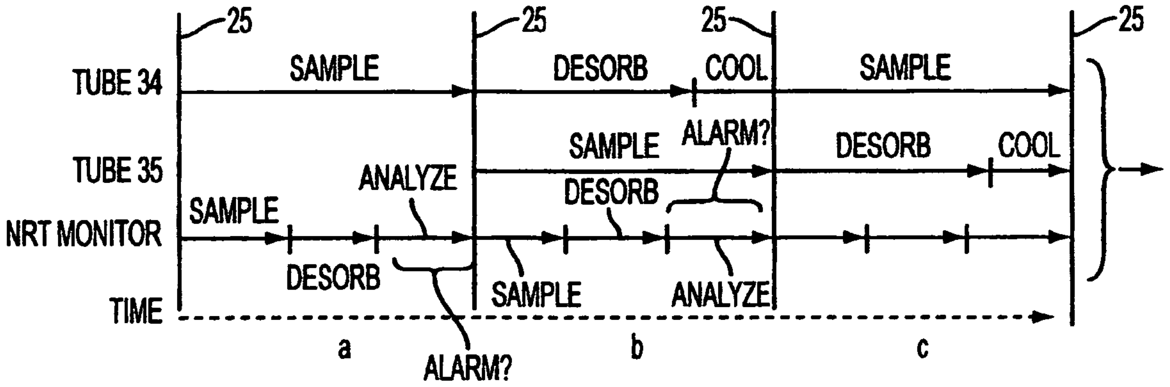
FIG. 4 is a depiction of the timing cycles of the NRT monitor and confirmation sampler.

The manner in which the timing cycles of the NRT monitor and the confirmation sampler are coordinated is schematically illustrated in FIG. 4. That Figure shows three cycles of the NRT monitor, designated along the bottom time line as cycles a, b, and c. A timing signal 25 at the beginning of each monitor cycle synchronizes the cycle of the confirmation sampler with that of the monitor. The top time line depicts the condition of sample tube 34, and the middle time line depicts the condition of sample tube 35 over that same three-cycle time period. During each cycle, a, b, c, the NRT monitor first draws a gas sample through a sorbent-packed sample tube for a predetermined period of time, then desorbs any chemical compounds captured during the sampling into an analyzer which may be a gas chromatograph, mass spectrometer, or other suitable analytical device to determine whether or not the chemical agent being monitored is present. In the meantime, a portion of the same gas stream sampled by the NRT monitor is passed through sample tube 34. The confirmation sampler constantly polls the NRT monitor to see if an alarm has been generated. If the NRT analyzer reports the presence of the chemical agent that is being monitored, it sounds an alarm and the system proceeds in the manner diagrammed in FIG. 5. If the NRT monitor fails to detect the presence of the chemical agent, it begins a new cycle, cycle b, of sampling, desorbing and analyzing. During cycle b, tube 34 is first desorbed and is then cooled to prepare it to again sample the gas stream during cycle c. During cycle b as well, tube 35 is sampling and, if the NRT monitor fails to alarm, tube 35 is then desorbed and cooled during cycle c to prepare it to again sample during the following cycle. Under normal operation, in the absence of the chemical agent being monitored, the cycles a, b, and c repeat endlessly.

Figure 5:
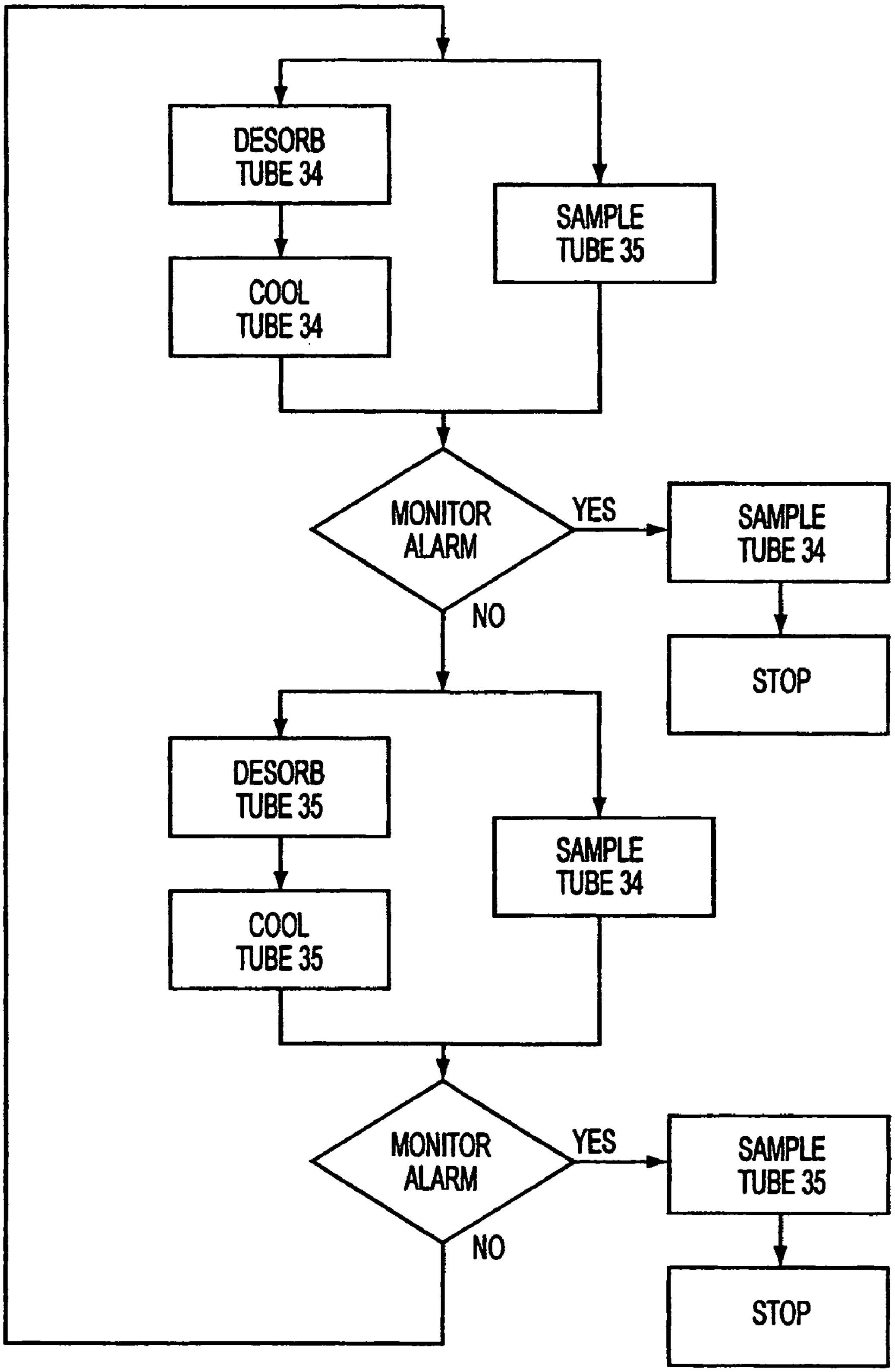
FIG. 5 is a decision flow chart of the sampling system of this invention.

FIG. 5 sets out a logic diagram that illustrates the control decisions that govern operation of the confirmation sampling system of this invention over a complete operating cycle. A representative portion of the atmosphere being monitored is passed through the first sample tube, tube 35, in synchronization with the sampling cycle of the NRT monitor. The confirmation sampler continuously polls the NRT monitor to see whether an alarm signal is generated by the monitor. If an alarm is generated, indicating that the chemical agent of concern is present, tube 35 is not desorbed but instead is preserved for retrieval and confirmation analysis. A second, follow-on sample is then obtained using the second sample tube, tube 34. As soon as the tube 34 sample is finished the system stops, preserving both the concurrently taken sample 35 and the follow-on sample 34 for retrieval and analysis. Depending upon the sampler configuration, more than two samples may be collected and preserved after the NRT monitor generates an alarm so as to obtain a more complete record of the triggering event.

Figure 6:
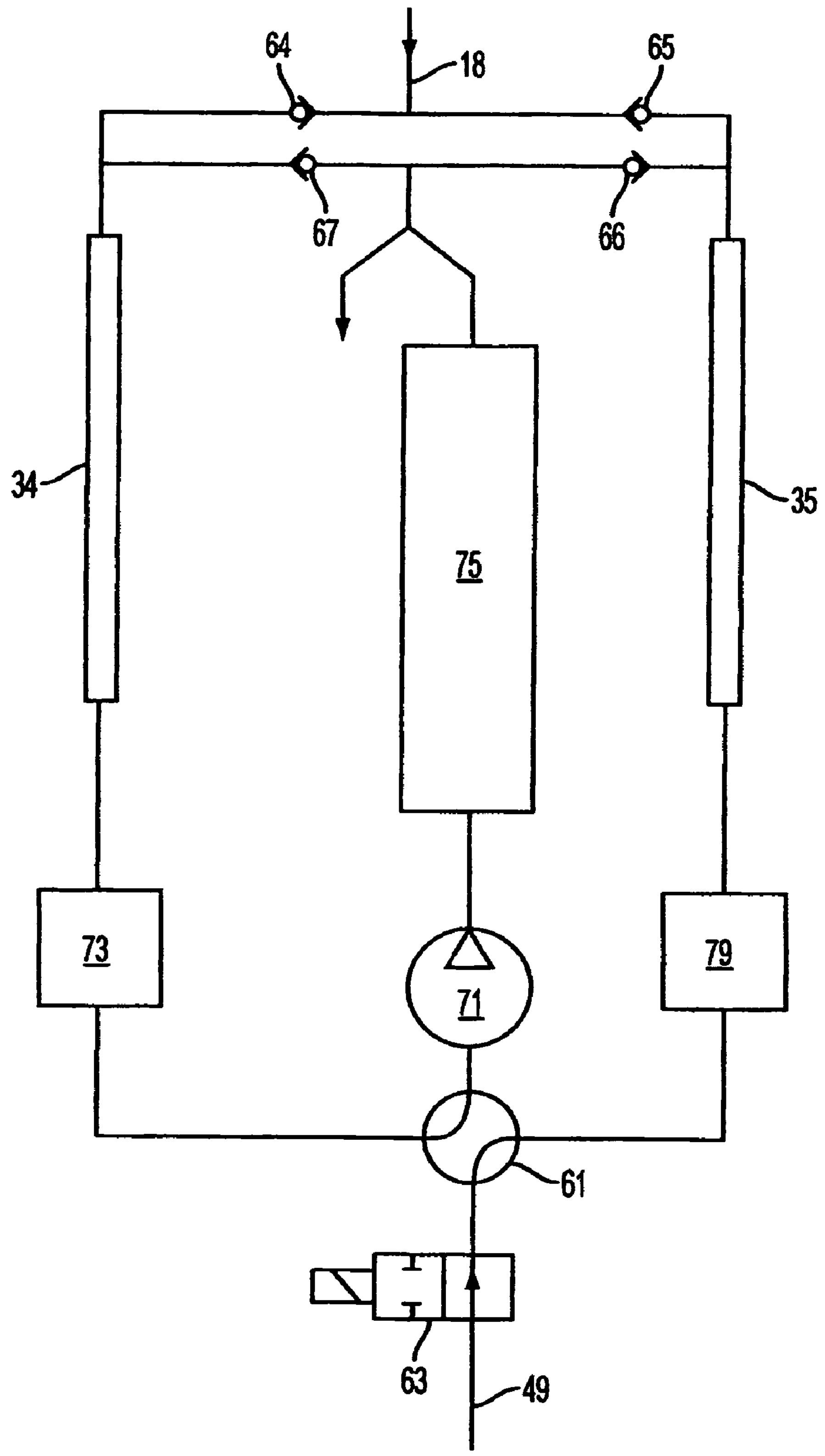
FIG. 6 is another embodiment of the confirmation sampler of this invention.

FIG. 6 illustrates another embodiment of the confirmation sampler 14 of this invention. Sampler 14, in this embodiment, includes a four-port, two-position valve 61, a two-port, two-position valve 63, and four check valves 64, 65, 66, and 67. Two sampling tubes, 34,35 are arranged in association with the valves in a manner that will be further described. FIG. 6 shows valve 61 in a first position whereat tube 34 is in a sampling position.

During the time that tube 34 is in sampling position, vacuum pump 71 pulls a flowing sample of the air or other gas that is being monitored through line 18 that is connected to the sample source. The sample is pulled first through check valve 64, which opens under the pressure of the sample gas, and then through sampling tube 34. Sample gas exiting from tube 34 is directed through heater 73 (which is off while tube 34 is sampling), through valve 61, and then to the inlet side of pump 71. Sampling rate is monitored and controlled by means of a flow meter/controller 75 located just downstream of pump 71. Check valves 66 and 67 remain closed under the positive pressure of gas exiting flow meter 75 causing the gas exhaust through line 77.

Sample tube 35 is desorbed, or purged, during a part of the time that tube 34 is in a sampling position. Valve 63 controls the flow of purge gas from supply line 49. The purge gas may be air, nitrogen, or other suitable gas. Valve 61 directs the purge gas flow through heater 79 and then through sampling tube 35 in a direction counter to that of the gas flow during sampling. Hot purge gas, now containing contaminants that were sorbed onto the packing of sampling tube 35, exits from heater 79 and causes check valve 66 to open while check valves 65 and 67 remain closed. The opening of check valve 66 provides a path for the purge gas to exhaust through line 77.

As was illustrated in the timing cycle diagram presented as FIG. 4, tube 35 is first purged and then cooled during the time that sample gas is passing through tube 34. Cooling of the sampling tube and its sorbent packing is necessary to prepare it for its sampling cycle, and cooling is accomplished by turning heater 79 to its off position while continuing the flow of purge gas through heater 79 and tube 35. It is possible to shorten the time required for cooling tube 35 by refrigerating the purge gas before its entry into tube 35, but refrigeration is not ordinarily required for satisfactory operation.

At the end of a predetermined time period, valve 61 is caused to move from its first to its second position, thus starting a new cycle in a fashion that is more completely described in the discussion of FIGS. 4 and 5. During that new cycle, sample gas passes from source 18, through check valve 65 and into sample tube 35. Gas exiting tube 35 passes through heater 79 (which is off during the time that tube 35 is in a sampling position), through valve 61 and into vacuum pump 71. As before, gas exiting pump 71 is directed through flow controller 75 and closed check valves 66 and 67 cause the gas to exhaust at 77. In the meantime, valve 63 allows purge gas to flow through heater 73, sampling tube 34, and then out of the system by way of check valve 67 and exhaust 77. Heater 73 is in its on position during the desorption of contaminants from the packing of sampling tube 34. That cycle repeats endlessly until the NRT analyzer reports the presence of the chemical agent being monitored, at which time the system proceeds in the manner diagrammed in FIG. 5.

Figure 7:
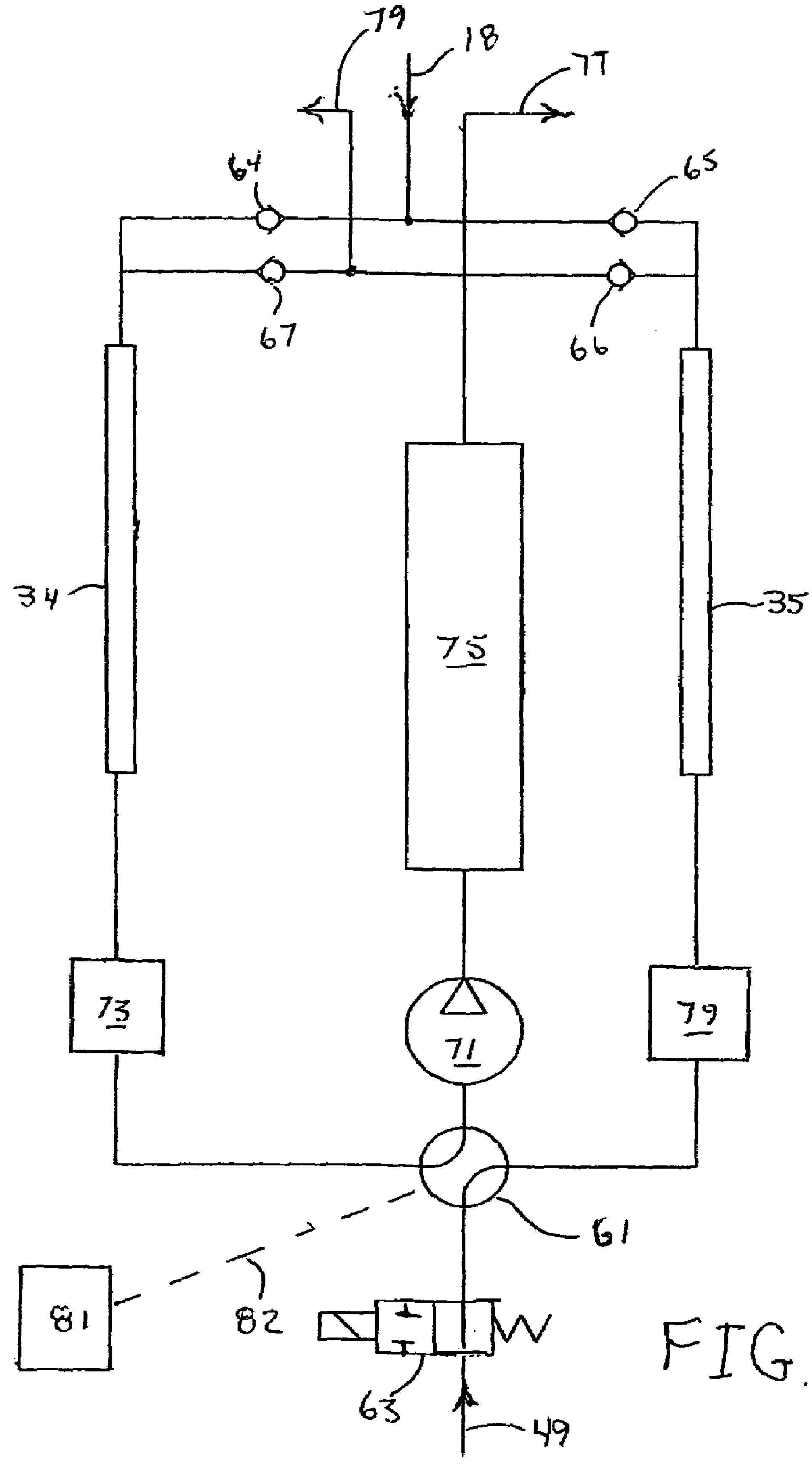
FIG. 7 is an alternative embodiment of the sampler that is shown in FIG. 6.

FIG. 7 illustrates an alternative embodiment of the FIG. 6 sampler. This embodiment includes the same arrangement of a four-port, two-position valve 61, a two-port, two-position valve 63, four check valves 64, 65, 66, and 67, and a pair of sampling tubes 34,35 as does the FIG. 6 embodiment. FIG. 7 shows valve 63 in a first position whereat tube 34 is in a sampling position. As in the FIG. 6 embodiment, vacuum pump 71 pulls a flowing sample of the air or other gas that is being monitored through line 18 that is connected to the sample source. The sample is pulled first through check valve 64, which opens under the pressure of the sample gas, and then through sampling tube 34. Sample gas exiting from tube 34 is directed through heater 73 (which is off while tube 34 is sampling), through valve 61, and then to the inlet side of pump 71. Sampling rate is monitored and controlled by means of a flow meter/controller 75 located just downstream of pump 71. Check valves 66 and 67 remain closed under the positive pressure of gas exiting flow meter 75 causing the gas to exhaust through line 77.

Sample tube 35 is desorbed, or purged, during a part of the time that tube 34 is in a sampling position. Valve 63 controls the flow of purge gas from supply line 49. The purge gas may be air, nitrogen, or other suitable gas. Valve 61 directs the purge gas flow through heater 79 and then through sampling tube 35 in a direction counter to that of the gas flow during sampling. Hot purge gas, now containing contaminants that were sorbed onto the packing of sampling tube 35, exits from heater 79 and causes check valve 66 to open while check valves 65 and 67 remain closed. The opening of check valve 66 provides a path 79 separate from the purge gas exhaust stream 77. Stream 79 is then directed to an analytical instrument (not shown) such as a gas chromatograph, infrared detector, or mass spectrometer. It is preferred that the entire path between the sample tube exit and the entry port of the analytical instrument be heated in order to avoid any condensation of the analyte on the tube walls.

This sampler embodiment may also be used as a stand-alone sampling device, in addition to its use as a confirmation sampler, by incorporation of a timer 81 into the system to generate a control signal 82 that causes valve 61 to toggle between its two positions. Maintaining the interval between timer signals constant fixes the same size because the flow rate through the sample tubes is controlled by means 75. That will permit a quantitative, rather than simply qualitative, analysis to be performed.

Figure 8:
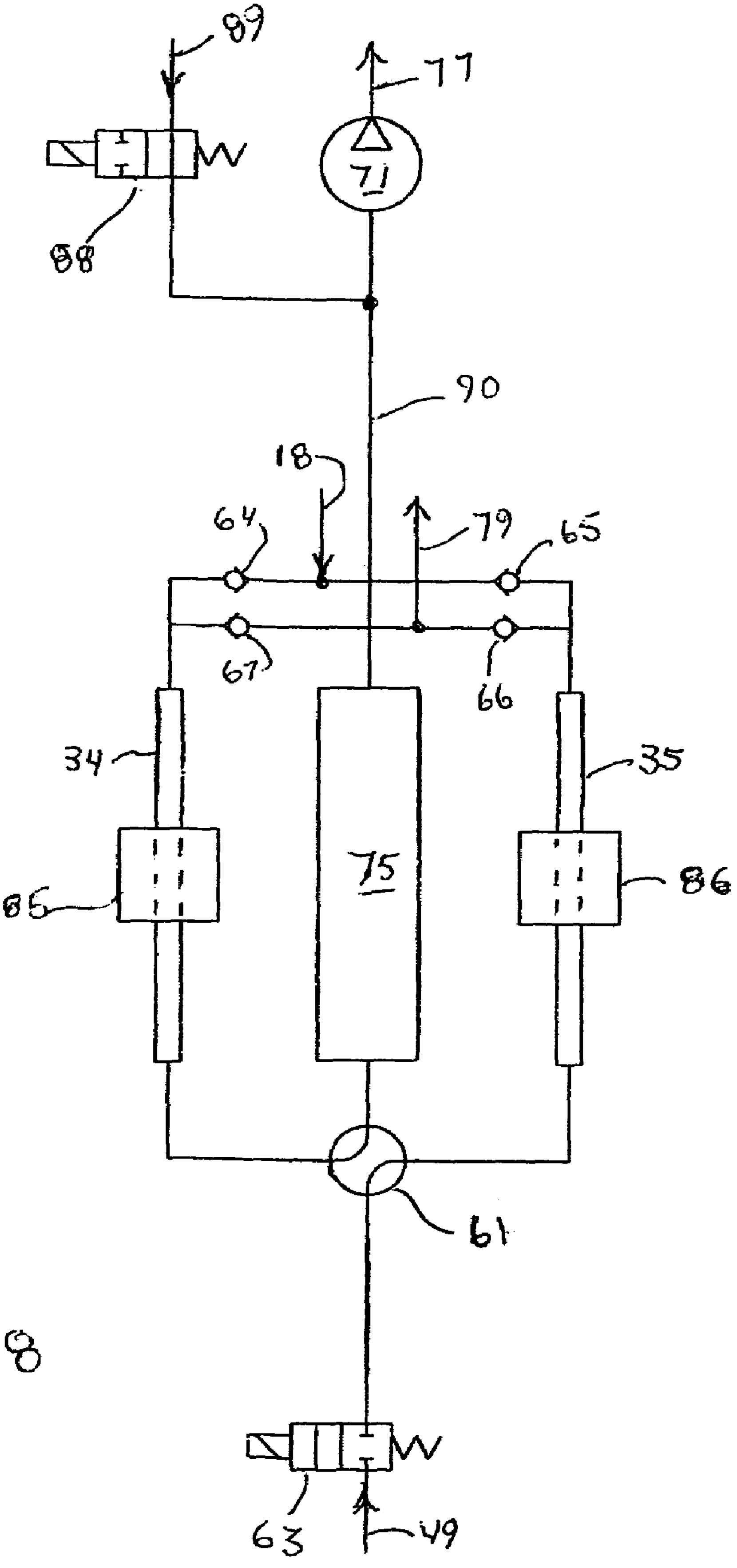
FIG. 8 is yet another embodiment of the FIG. 6 sampler.

Yet another embodiment of the FIGS. 6 and 7 samplers is shown in FIG. 8. In this embodiment, pump 71 is arranged downstream from flow meter/controller 75, and sample tube heaters 85 and 86 replace purge gas heaters 73 and 74 of the other embodiments. It is preferred that pump 71 be an electric motor driven, diaphragm pump. Electric motors powering such pumps typically have a low starting torque, and are unable to start the pump against the back pressure which develops if power to the system is interrupted during operation. In this embodiment, a two-port, two-position solenoid valve 88 is arranged such that it is in an open position as shown upon loss of power to pump 77. That allows air or other gas from source 89 to enter line 90, which connects the flow controller 75 to the pump 71, thereby relieving the back pressure on the pump diaphragm. As soon as power is restored, valve 88 moves to its other position, closing off access to line 90. As in the FIG. 7 embodiment, valve 61 may be controlled by means of a timer to allow operation of the system as a stand-alone sampling device.

The embodiments of this invention that have been described in the specification of this patent application are those that are presently preferred, and are not to be considered limiting.

We claim:

1. A system for the monitoring of a gaseous atmosphere to detect a particular chemical compound in said atmosphere and to confirm the presence or absence of that compound, said system comprising:

a monitor and alarm system that is arranged to cyclically and continuously monitor said gaseous atmosphere by drawing a sample from said gaseous atmosphere and to immediately thereafter analyze said sample to detect and to report the presence of said compound;

a confirmation sampler, said confirmation sampler having at least two sorbent-containing sampling tubes and including a four-port, two-position valve and four check valves arranged in association with said sampling tubes to direct flow of the gas being sampled through a first one of said sampling tubes and then to exhaust and to direct a stream of hot purge gas through the second one of said sampling tubes and then to an analytical instrument when said two-position valve is in a first position, and to direct a stream of hot purge gas through the first of said sampling tubes and then to an analytical instrument, and to direct flow of the gas being sampled through the second one of said sampling tubes and then to exhaust when said two-position valve is in its second position;

means for drawing a gaseous sample alternately through the first of said sampling tubes and then through the second of said sampling tubes;

means for purging contaminants sorbed on packing contained in said sampling tubes after said gaseous sample has been drawn through the tubes;

means to synchronize the cyclic operation of said monitor and said confirmation sampler so that during that time interval during which the monitor is sampling, so also is one of said tubes of the confirmation sampler;

means responsive to a report of said chemical compound generated by the monitor, said responsive means arranged to cause said confirmation sampler to retain and not to purge that sampling tube employed during the cycle of said monitor that generated said report.

2. The system of claim 1 wherein said means for drawing a gaseous sample through said sampling tubes includes a vacuum pump and means to measure and control the flow of gas through said tubes.

3. The system of claim 2 wherein said vacuum pump is located downstream from said gas measurement and control means.

4. The system of claim 3 wherein said vacuum pump is a diaphragm pump, said system including means to relieve back pressure upon the pump at start-up.

5. The system of claim 4 wherein said back pressure relief means comprises a valve that is arranged to allow gas communication between the atmosphere and the suction side of said pump when the pump is not powered.

6. The system of claim 1 wherein said means for purging contaminants sorbed on packing contained in said sampling tubes comprises means for flowing a heated stream of purge gas through said sampling tubes in a direction opposite to the direction of gas flow during sampling.

7. The system of claim 1 wherein said means for purging contaminants sorbed on packing contained in said sampling tubes comprises means for directly heating said sampling tubes while flowing a stream of purge gas through said sampling tubes in a direction opposite to the direction of gas flow during sampling.

8. The system of claim 1 wherein said analyzer is either a gas chromatograph or a mass spectrograph.

9. The system of claim 1 wherein said means to synchronize the cyclic operation of said monitor and said confirmation sampler includes means to generate a timing signal that is transmitted to said sampler at the beginning of a monitor cycle.

10. A sampler for monitoring a gaseous atmosphere comprising:

sampling means having at least two sorbent-containing sampling tubes and including a four-port, two-position valve and four check valves arranged in association with said sampling tubes to direct flow of the gas being sampled through a first one of said sampling tubes and then to exhaust and to direct a stream of hot purge gas through the second one of said sampling tubes and then to an analytical instrument when said two-position valve is in a first position, and to direct a stream of hot purge gas through the first of said sampling tubes and then to an analytical instrument, and to direct flow of the gas being sampled through the second one of said sampling tubes and then to exhaust when said two-position valve is in its second position;

pump and valve means for drawing a gaseous sample alternately through the first of said sampling tubes and then through the second of said sampling tubes;

means for purging contaminants sorbed on packing contained in said sampling tubes after said gaseous sample has been drawn through the tubes; and timing means controlling said valve means to toggle between two positions, the first of said positions causing said gaseous sample to be drawn through the first of said tubes, and the second of said positions causing said gaseous sample to be drawn through the second of said positions.

11. The sampler of claim 10 wherein said pump means comprises a diaphragm vacuum pump and wherein said sampler includes gas flow control means to control the flow rate through the sampling tubes of the gas being sampled.

12. The sampler of claim 11 wherein said pump means is downstream from said gas flow control means.

13. The sampler of claim 12 including means to relieve the back pressure on said pump upon start up of the sampler.

14. The sampler of claim 13 wherein said back pressure relief means comprises a two-port, two-position, solenoid valve arranged to open communication between the atmosphere and the suction side of said pump when said pump is not powered.

15. The system of claim 10 wherein said means for purging contaminants sorbed on packing contained in said sampling tubes comprises means for directly heating said sampling tubes while flowing a stream of purge gas through said sampling tubes in a direction opposite to the direction of gas flow during sampling.

* * * * *